(12) United States Patent
Huang et al.

(10) Patent No.: US 9,324,984 B2
(45) Date of Patent: Apr. 26, 2016

(54) DIRECT FORMATION OF A SEPARATOR WITH A PROTECTIVE EDGE ON AN ELECTRODE

(71) Applicant: GM Global Technology Operations LLC, Detroit, MI (US)

(72) Inventors: Xiaosong Huang, Novi, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 13/757,396

(22) Filed: Feb. 1, 2013

(65) Prior Publication Data

US 2014/0220233 A1    Aug. 7, 2014

(51) Int. Cl.
| | |
|---|---|
| *H01M 4/04* | (2006.01) |
| *H01M 4/13* | (2010.01) |
| *H01M 2/14* | (2006.01) |
| *H01M 2/16* | (2006.01) |

(52) U.S. Cl.
CPC .............. *H01M 2/145* (2013.01); *H01M 2/168* (2013.01)

(58) Field of Classification Search
None
See application file for complete search history.

(56) References Cited

U.S. PATENT DOCUMENTS

| | | | |
|---|---|---|---|
| 3,916,823 A * | 11/1975 | Halloran ........................ 118/63 |
| 2003/0099878 A1* | 5/2003 | Kramlich et al. ............. 429/162 |
| 2005/0155411 A1* | 7/2005 | Rogalla et al. ............... 73/31.05 |
| 2011/0129731 A1* | 6/2011 | Wakizaka et al. ............. 429/217 |
| 2011/0135987 A1* | 6/2011 | Shin .............................. 429/144 |
| 2011/0236762 A1 | 9/2011 | Huang et al. |
| 2012/0102725 A1 | 5/2012 | Fuller et al. |
| 2012/0231321 A1 | 9/2012 | Huang et al. |

FOREIGN PATENT DOCUMENTS

WO   WO 2012/060604   *   5/2012

OTHER PUBLICATIONS

Machine Translation of Seo et al. (WO 2012/060604)—no date available.*

* cited by examiner

*Primary Examiner* — Lisha Jiang
(74) *Attorney, Agent, or Firm* — Harness, Dickey & Pierce, P.L.C.

(57) ABSTRACT

A method for forming integral separator-electrodes for a battery. The method comprises providing a continuous electrode sheet having an electrode active material deposited on a current collector. The method includes forming a plurality of individual electrodes from the continuous electrode sheet. Each electrode is formed having a center region and a plurality of edges. A separator coating having a substantially uniform thickness is applied to the center region and the plurality of edges of each electrode. The separator coating layer is larger in size than the electrode active material coated area.

13 Claims, 4 Drawing Sheets

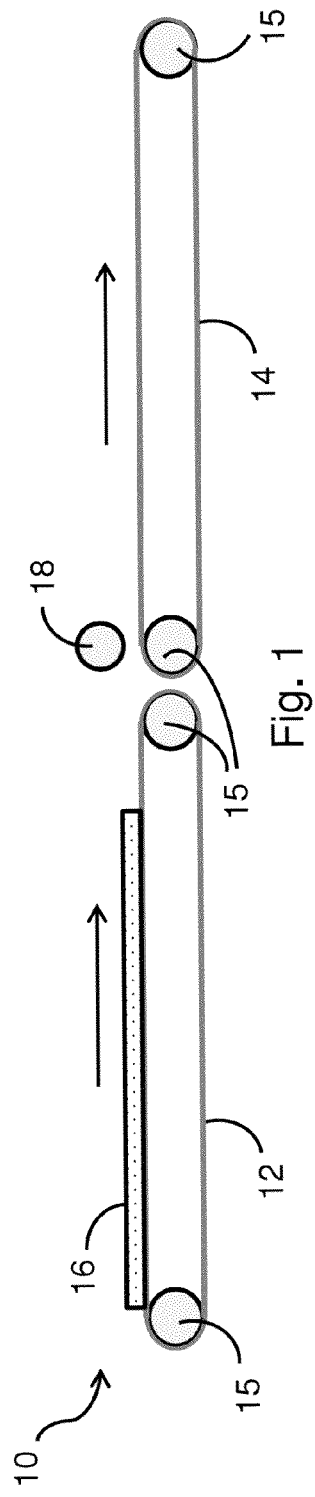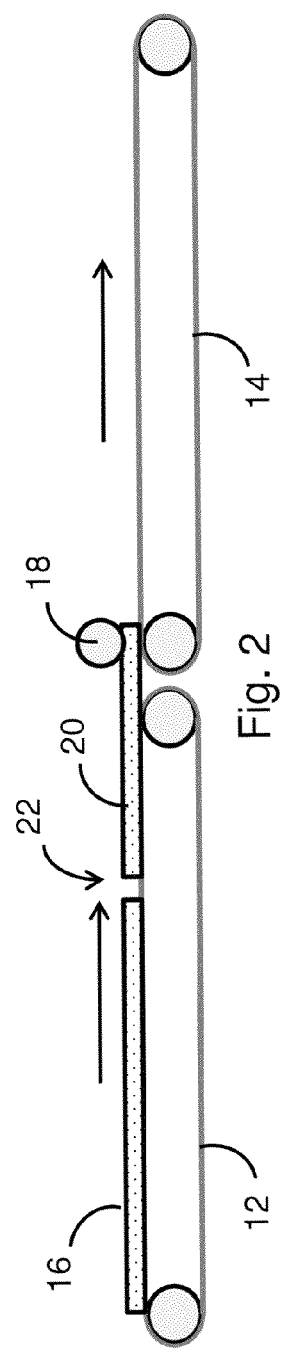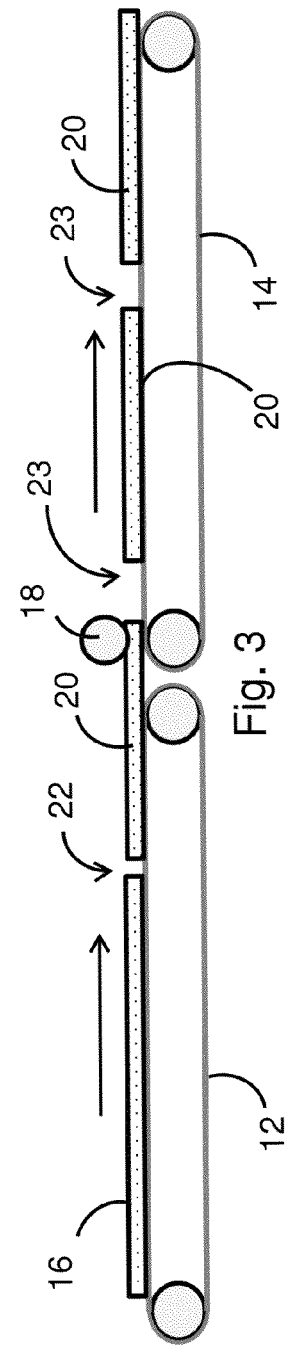

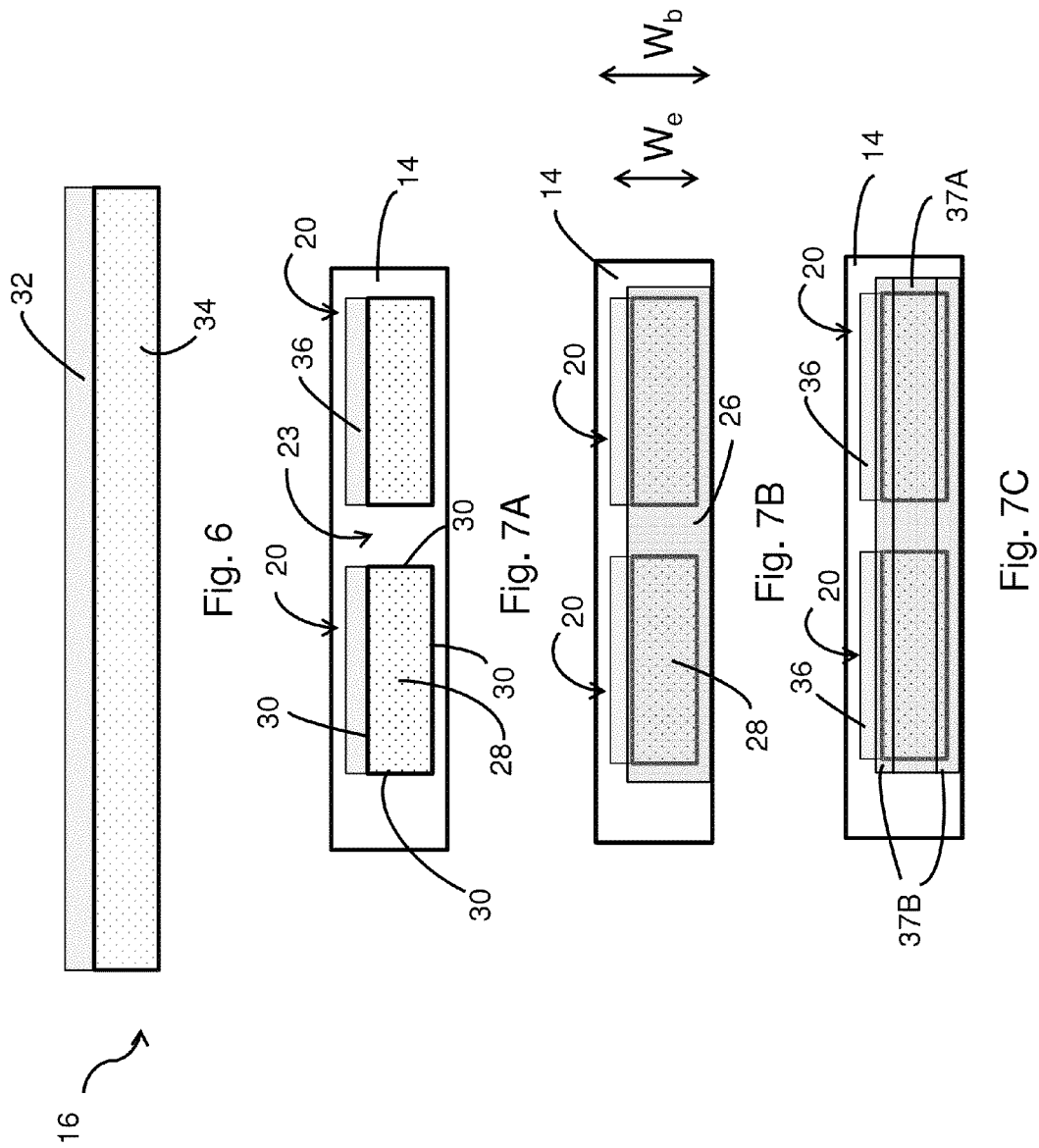

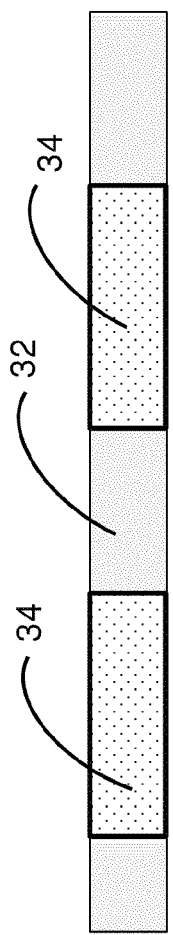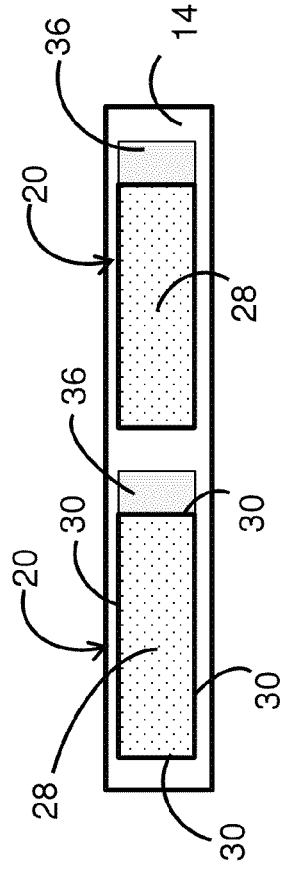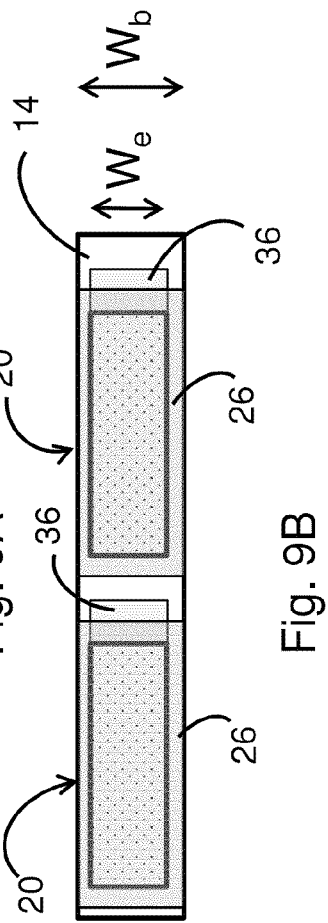

DIRECT FORMATION OF A SEPARATOR WITH A PROTECTIVE EDGE ON AN ELECTRODE

FIELD

The present disclosure relates to electrodes with an integral separator material coating directly applied thereon.

BACKGROUND

This section provides background information related to the present disclosure which is not necessarily prior art.

Lithium-ion and related batteries generally operate by reversibly transporting lithium ions between negative and positive electrodes. The basic unit of a lithium-ion battery is an individual cell that includes an anode, a cathode, and a non-aqueous electrolyte. To prevent physical contact (electron-conducting contact) between the anode and cathode, which would result in an internal short circuit, a separator may be positioned between the electrodes. The separator, commonly a polyolefin polymer, may be microporous and contain small pores that are filled with the electrolyte to provide pathways for the passage of lithium ions from one electrode to the other. The separator is an expensive component. In order to reduce the battery cost, various attempts have been made at directly forming a separator on an electrode to fabricate an integral separator/electrode However, separator coatings formed this way are smaller in size or have the same size as the electrode substrate, which can cause an internal battery short at the electrode edges.

Thus, there remains a need for a continuous process to form separator coating layers larger in size than the electrode substrate.

SUMMARY

This section provides a general summary of the disclosure, and is not a comprehensive disclosure of its full scope or all of its features.

In various aspects, the present technology provides a method for forming integral separator-electrodes for a battery. One method comprises providing an electrode sheet including an electrode active material deposited on a current collector. The method includes forming a plurality of individual electrodes from the electrode sheet. Each electrode is formed having a center region and a plurality of edges. A separator coating having a substantially uniform thickness is applied to the center region and the plurality of edges of each electrode.

In other aspects, the method for forming integral separator-electrodes for a battery comprises providing a continuous electrode sheet on a first carrier belt. The continuous electrode sheet comprises an electrode active material deposited on at least a portion of a current collector. The continuous sheet is cut or divided into a plurality of individual electrodes, each electrode having a center region and a plurality of edges. The method may include transferring the electrodes to a second carrier belt, thereby separating the electrodes from one another. A substantially uniform thickness separator coating is then applied to each electrode. The separator coating is applied to at least a portion of the center region and the plurality of edges, forming an integral separator-electrode with protective edges.

The present technology also provides a continuous process for the direct formation of a separator coating on electrodes for a battery. The process comprises providing a continuous electrode sheet on a first carrier belt. The continuous electrode sheet comprises an electrode active material deposited on at least a portion of a current collector. The process includes cutting the continuous sheet into a plurality of individual electrodes, with each electrode having a center region, a plurality of edges, and a tab portion. The tab portion is substantially free from electrode active material. A separator coating is then applied to the electrode active material of the center region and the plurality of edges of each electrode, forming a plurality of separator-electrodes with integral tabs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic illustration of a pair of carrier belts according to various aspects of the present technology;

FIG. 2 is the schematic illustration of FIG. 1, further demonstrating an electrode passing from a first carrier belt to a second carrier belt;

FIG. 3 is the schematic illustration of FIG. 1, further demonstrating the spacing of electrodes on the second carrier belt;

FIG. 6 illustrates a top plan view of a continuous sheet of electrode including an electrode active material disposed on a portion of a current collector according to one aspect of the present technology;

FIGS. 7A-7C are top plan views of a carrier belt and electrodes cut from the continuous sheet of FIG. 6;

FIG. 8 illustrates a top plan view of a continuous sheet of electrode including an electrode active material disposed on a portion of a current collector according to another aspect of the present technology; and FIGS. 9A-9B are top plan views of a carrier belt and electrodes cut from the continuous sheet of FIG. 8.

Corresponding reference numerals indicate corresponding parts throughout the several views of the drawings.

DETAILED DESCRIPTION

Figure 4:
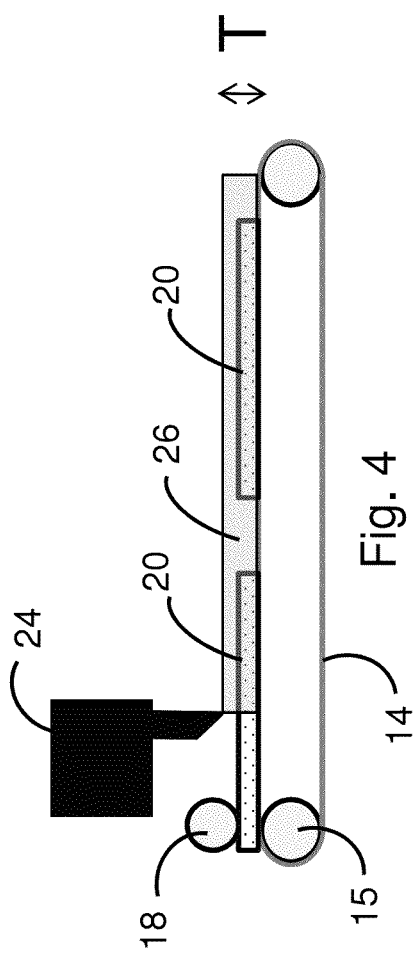
FIG. 4 is a schematic illustration demonstrating a separator coating applied to an electrode on a carrier belt.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an,"

and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology enhances lithium-ion battery cell performance by contemplating an integral combination of an electrode with a separator directly applied thereon as a coating. In various aspects, the present technology provides methods and processes for forming integral separator-electrodes, and additionally offers edge protection to the electrodes.

FIG. 1 is a schematic illustration of one embodiment of a system 10 that includes a pair of carrier belts 12, 14. For simplicity, the carrier belts 12, 14 are shown adjacent to one another in a series type arrangement; however, it should be understood that various other arrangements and combinations of carrier belts are applicable with the methods disclosed herein. As shown, the carrier belts 12, 14 may be coupled to appropriate gears or roller mechanisms 15 operable to assist in controlling their speed and movement as is known in the art. The arrows indicate the direction of travel. The method includes providing a continuous electrode component or sheet 16 having an electrode active material deposited on a current collector on the first carrier belt 12. The continuous electrode sheet 16 may have a predetermined size or shape, or may be a continuous sheet or roll of material that can be used with a continuous process. As will further be discussed below with reference to FIGS. 6 and 8, the electrode sheet 16 may include a metal foil (e.g., current collector) 32 or equivalent thin conducting element having an electrode active material 34 deposited on at least a portion thereof. The electrode active material can include any material suitable for lithium-ion batteries, electrochemical cells, or the like, and is not intended to be limited to any specific composition, chemistry, or application.

The methods may include forming a plurality of individual electrodes from the electrode sheet 16. With reference to FIG. 2, the electrode sheet 16 may be carried along the first carrier belt 12 and pass a cutting device or blade element (not shown) operable to cut a continuous sheet of an electrode 16 into a plurality of individual electrodes 20. It should be understood that the electrode 16 may also be cut into a plurality of individual electrodes 20 using other known methods, which may or may not use a carrier belt system. Once cut, the individual electrodes are generally separated from one another only by a small gap 22. Accordingly, in various aspects, the electrodes 20 may be transferred to a second carrier belt 14 after the cutting process. The second carrier belt 14 may be operated at a speed greater than a speed of the first carrier belt 12, which increases the gap 23 or separation distance between the electrodes 20 as shown in FIG. 3. As shown in FIGS. 1-3, the electrodes 20 may optionally pass through a roller mechanism 18 to ensure the electrodes 20 are substantially flat and/or are properly aligned when transferred to the second carrier belt 14.

Figure 5:
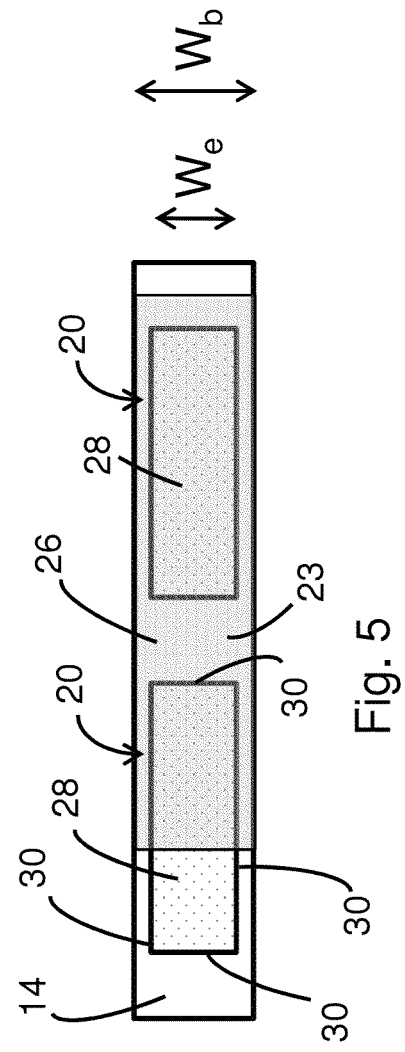
FIG. 5 is a top plan view of the carrier belt and electrodes of FIG. 4.

FIGS. 4 and 5 represent one non-limiting, exemplary separator coating process that provides integral edge protection for an electrode. FIG. 4 is a schematic illustration demonstrating a generic coating apparatus 24 configured to dispense and apply a separator coating 26 to an electrode 20 being transferred in a linear direction by the carrier belt 14. In certain aspects, more than one coating apparatus may be used, for example, when it is desired to apply more than one separator coating. FIG. 5 is a top plan view of the carrier belt 14 and electrodes 20 of FIG. 4 with a separator coating 26 applied and/or deposited thereon. As shown in FIG. 5, each electrode 20 is preferably formed having an exposed major face, or center region 28, and a plurality of edges 30 or outermost regions. The separator coating 26 is preferably dispensed having a substantially uniform thickness (T), and is applied to the center region 28 and regions adjacent to and including the plurality of edges 30 of each electrode 20 to protect the edges. As such, the coating 26 offers integral edge protection of the electrodes 20 that is not otherwise available using conventional coating techniques, for example, where the separator coating layer is not larger in size than the electrode active material coated area.

The coating process may utilize any known coating technology, and in certain embodiments, the separator coating 26 may be applied using doctor blading, slot die coating, spray coating, and curtain coating processes as are known in the art. In various aspects, at least one or both of the first and second carrier belts 12, 14 are preferably provided with a belt width ($W_b$) greater than a width ($W_e$) of the electrodes 20, and the coating 26 may be applied across an entirety or a portion (but wider than $W_e$) of the width ($W_b$) of the carrier belt 14. Thus, the separator coating layer 26 may be larger in size as compared to the electrode 20 to provide the edge protection.

FIG. 6 illustrates one embodiment of a continuous electrode sheet 16 including an electrode active material 34 disposed on a portion of a current collector 32. As shown, at least a portion of the current collector element 32 may be left exposed, or free from an electrode active material 34. FIGS. 7A, 7B, and 7C represent top plan views of the carrier belt 14 including the individually cut electrodes 20 with and without a separator coating 26 applied thereon. FIG. 7A illustrates electrodes having a center portion 28, a plurality of edge portions 30, and an integral tab portion 36 extending therefrom, which can be configured to conduct current to the battery. FIG. 7B illustrates a continuous separator coating 26 applied along a portion of the carrier belt width ($W_b$), leaving the tab portion substantially free of the separator coating 26. In certain embodiments, portions of the continuous sheet 16 may be covered or blocked with an appropriate masking material (not shown) prior to the application of the coating, wherein the masking material can be removed subsequent to the coating process, revealing uncoated regions.

FIG. 7C illustrates another embodiment where more than one separator coating may be applied to the electrode 20. For example, it may be desirous to apply a first separator coating 37A including a first polymer to the centermost region 28 of the electrode, and a second separator coating 37B including a second polymer to at least one region of the electrode adjacent to one of the plurality of edges 30. In one example, the first polymer may comprise a porous polymer to allow for the transfer of ions, and the second polymer may comprise a non-porous polymer. It is preferred that the polymer(s) for the centermost region 28 and the polymers for each region of the electrode adjacent to one of the plurality of edges 30 are compatible with each other, for example, can form strong non-covalent bonds in order to exhibit good interfacial adhesion.

FIG. 8 illustrates another embodiment of a continuous electrode sheet 16 including an electrode material 34 disposed on a portion of a current collector 32. As shown, at least a portion of the current collector element 32 may be left exposed, or free from an electrode active material 34. FIGS. 9A and 9B represent top plan views of the carrier belt 14 including the individually cut electrodes 20 with and without a separator coating applied thereon, respectively.

FIG. 9A illustrates electrodes having a center portion 28, a plurality of edge portions 30, and an integral tab portion 36 extending therefrom, which can be configured to conduct current to the battery. FIG. 9B illustrates a separator coating 26 applied along an entirety of the carrier belt width ($W_b$), leaving the tab portion substantially free of the separator coating 26. In this embodiment, the application of the coating is interrupted to keep at least a portion of the tab 36 free from the separator coating. Alternatively, the tab portion 36 may be masked prior to the coating process. Although not specifically shown, the separator coating 26 of FIG. 9B may also include more than one coating or coating regions, with the centermost portion 28 having a different coating than a region adjacent to one of the edges 30, for example, similar to the embodiment as shown in FIG. 7C.

In various aspects, the separator coating layer 26 may include a ceramic particle dispersion. In other embodiments, the separator coating 26 may include a liquid mixture comprising a polymer, a solvent, and water. For example, the liquid mixture may include polyvinylidene fluoride (PVDF), acetone, and water. In still other aspects, the separator coating 26 may include a mixture of various compatible polymers, gel-polymers, solvents, and ceramic particles. Where it is desirous to have a non-porous coating near the edges, it may be preferred to use PVDF, polysulfone, polyimide, aromatic and aliphatic polyamide (e.g., Kevlar and Nylon) resins, polyolefin, and water soluble cellulose derivatives.

Where ceramic particles are used, the ceramic particles may be in intimate contact with the electrode material surface and minimize the extent of any dendrites that may form and reduce the interfacial resistance. This may extend the useful working life of the cell, improve the ability of the battery to tolerate abuse, and convey good temperature resistance. Polymer present in the separator coating may provide additional electronic insulation and serve to retain the ceramic in intimate contact with the electrode and to suppress spalling or flaking of a ceramic layer. Absent the polymer, spalling or flaking of the ceramic particles may result from the cyclic growth and shrinkage of the electrode resulting from insertion and removal of elemental lithium, handling damage during cell assembly, or in-service thermal or vibratory stresses. The polymer may adhere to any one or more of the ceramics, the electrode material, and/or the current collector.

In embodiments in which the ceramic particles are bonded to the electrode material and to one another, the ceramic particles may be incorporated into a dilute solution of a binder dissolved into a significant excess of solvent. Generally the binder may be present in an amount ranging from about 0.2% to about 25% by weight of the solvent. The ceramic particles may be added in suitable quantity to form a viscous, paste-like slurry with the dilute binder solution. Suitable ceramic particles may include any hard, electrically-insulating compound, often an oxide or nitride, and may include compounds of silicon, aluminum, titanium, magnesium or calcium. It is preferred that the particles have an average particle size of around 1 micrometer; however, particles with an average size ranging from about 0.005 micrometers to about 10 micrometers may be used. The particles may be irregular in shape but are preferably generally equiaxed so that when stacked together or compacted they will be in line or point contact with neighboring particles with pores between adjacent particles. Porosity of the separator coating may vary from about 20% to about 90% by volume as is known in the art, preferably between about 40% to about 70%.

The separator coating layer of the present technology may also be applied to assist with resisting mechanical penetration. For this reason, it may be preferred that the particle size be selected to be less than one-half of the desired layer thickness. This criterion should help to ensure that the separator coating layer includes at least two tiers of particles, such that particles in the upper tier may nest in the lower tier and more completely shield the surface from penetration.

As mentioned above, the separator coating may be supplied as a particle slurry to the electrode material in any convenient manner including using a doctor blade, a slot die coater, curtain coating, or a comma bar coater each of which is effective in applying a layer of generally uniform thickness coextensive with the electrode material. The thickness of the applied slurry may be selected to ensure that the resulting particle layer thickness ranges from about 5 micrometers to about 45 micrometers. As deposited, pores formed between abutting particles may be filled with the dilute binder solution. However, evaporation of the solvent may reduce the volume of the solution, causing it to shrink and leave a series of interconnected voids or pores behind. In various aspects, a volume fraction of voids of about 30% to about 90% may be anticipated. Upon complete evaporation of the solvent, the binder material will be left connecting all the particles and binding them together. The binder will also be effective in binding the particles to graphite-based anodes.

The selection of binder for the separator coating layer may be partially based on the procedure used to deposit any additional polymer layer, which may be dissolved in a solvent and applied as a solution. Preferably, the solvent used to dissolve the polymer of a second layer does not dissolve the first layer binder. However, the kinetics of dissolution are relatively slow, while the coating and drying processes are rapid. Thus, a solvent capable of dissolving the first layer binder may be acceptable as may a solvent that induces swelling in the first layer binder. Commonly, deposition of the polymer overlayer occurs from a solution of polymer dissolved predominantly in acetone, containing modest quantities of water. Hence it may be preferred that the particle binder material be acetone-insoluble. Suitable acetone-insoluble binder materials for the ceramic powders may include polyacrylonitrile (PAN), polyamide, or polyimide. Suitable solvents for these binders include dimethylformamide (DMF), dimethyl sulfoxide (DMSO), tetrahydrofuran (THF), and N-methylpyrrolidone (NMP).

Similar to the case of interparticle contact, there may be only line or point contact between the deposited ceramic and the electrode material surface so that an electrolyte impregnated into the porosity of the ceramic layer may freely contact and convey ions to or from the electrode.

A solution of polymer, for example polyvinylidene fluoride (PVDF), dissolved in an acetone-water solvent containing an appreciable excess of acetone may be applied in place of, or in addition to, the ceramic-binder. For example, upon evaporating the solvent, PVDF can be deposited on the ceramic layer. Evaporation of the solvent is selective with acetone evaporating first and promoting phase separation of the acetone and water constituents of the solvent as the concentration of water in the solvent increases. The polymer may segregate to the acetone, with the final evaporation of the acetone producing a sponge-like, open-pored structure of polymer surrounding the remaining water. Further evaporation to eliminate the water results in formation of the desired microporous polymer layer. Such a microporous layer may be impregnated by electrolyte to enable transfer of lithium ions to and from the electrode material. The thickness of the ceramic layer may be about 25 micrometers with a porosity of about 60%, while the thickness of the polymer layer may be less than 10 micrometers with a porosity of greater than 40%.

To obtain good adhesion between the ceramic and polymer layers, the polymer-solvent solution should partially wet the binder layer securing the particles so that, after evaporation of the solvent, the precipitated polymer may bond to the ceramic binder coating.

When no binder is used in the first layer, particles can be sprayed onto the electrode material. They can also be deposited on the electrode by a dispersion coating process as described previously. If the particles of the powder layer are not attached to one another and to the electrode by a separate binder, a similar result may be obtained by coating the unattached powder layer with the acetone-water-PVDF solution just described. A portion of this dilute solution, when applied to the particle layer, may be wicked by capillary action into the pores between the particles. Upon evaporation of the solvent, the particles may be bound together and attached to the electrode by the PVDF. The particles may also be retained by the porous PVDF overlayer.

A suitable alternative polymer may be poly(methyl methacrylate) (PMMA). Paralleling the process just described for PVDF, a similar process of dissolving PMMA in an acetone-water solvent solution followed by selective evaporation may be followed to develop a porous PMMA layer. A non-porous layer of PMMA may also be applied using acetone alone as a solvent. In this case, the PMMA, when saturated with liquid electrolyte forms a Li-ion conducting gel for lithium ion transport within the cell.

It is envisioned that the separator coating can include various polymer gels as desired. For example, the coating composition can include a polymer such as PVDF, PMMA, or PAN, a lithium containing salt ($LiPF_6$, $LiBF_4$, $LiClO_4$, $LiAsF_6$, $LiSO_3CF_3$, or $LiN(SO_2C_2F_5)_2$), an optional plasticizer (ethylene carbonate, propylene carbonate), an optional filler (fumed silica), and a solvent (dimethyl carbonate, tetrahydrofuran, acetone) mixed to form a solution. The solution can be applied onto the electrode material and form a gel layer once the solvent is evaporated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming an integral separator-electrode for a battery, the method comprising:
   providing an electrode sheet including an electrode active material deposited on at least a portion of a current collector;
   forming a plurality of individual electrodes from the electrode sheet, each electrode of the plurality of individual electrodes respectively having a center region and a plurality of edges; and
   applying a substantially uniform thickness separator coating over each electrode of the plurality of individual electrodes, the applying of a substantially uniform thickness separator coating further comprises applying a first separator coating to at least a portion of the center region of each electrode of the plurality of individual electrodes and applying a second separator coating to a region that is adjacent to at least one of the plurality of edges of each electrode of the plurality of individual electrodes, wherein the first separator coating comprises a porous polymer layer and the second separator coating comprises a non-porous polymer layer.

2. The method of claim 1, wherein forming a plurality of individual electrodes comprises placing the electrode sheet on a first carrier belt and cutting the electrode sheet into a plurality of individual electrodes.

3. The method of claim 2, further comprising transferring the individual electrodes to a second carrier belt prior to applying the separator coating, wherein the second carrier belt operates at a speed greater than a speed of the first carrier belt.

4. The method of claim 3, wherein at least one of the first and second carrier belts has a width greater than a width of the individual electrodes.

5. The method of claim 1, wherein applying the first separator coating comprises applying a liquid mixture comprising polyvinylidene fluoride, acetone, and water.

6. The method of claim 1, wherein applying the first separator coating comprises applying a liquid mixture comprising a polymer and a ceramic particle.

7. The method of claim 1, wherein the applying a substantially uniform thickness separator coating over each electrode further comprises forming a tab portion on each electrode, the tab portion being substantially free of the substantially uniform thickness separator coating and configured for conducting current to the battery.

8. A method for forming an integral separator-electrode assembly for a battery, the method comprising:
provided a continuous electrode sheet on a first carrier belt, the continuous electrode sheet comprising an electrode active material deposited on at least a portion of a current collector;
cutting the continuous electrode sheet into a plurality of individual electrodes, each electrode of the plurality of individual electrodes having a center region and a plurality of edges;
transferring each of the electrodes of the plurality of individual electrodes to a second carrier belt, thereby separating each of the electrodes of the plurality of individual electrodes from one another; and
applying a substantially uniform thickness separator coating to each electrode of the plurality of individual electrodes, the applying of a substantially uniform thickness separator coating further comprises applying a first separator coating to at least a portion of the center region of each electrode of the plurality of individual electrodes and applying a second separator coating to a region that is adjacent to at least one of the plurality of edges of each electrode of the plurality of individual electrodes, wherein the first separator coating comprises a porous polymer layer and the second separator coating comprises a non-porous polymer layer, wherein each electrode having the separator coating thereby forms an integral separator-electrode assembly.

9. The method of claim 8, further comprising passing the electrodes under a roller prior to applying the separator coating.

10. The method of claim 8, wherein applying the separator coating to each electrode comprises using a coating process selected from the group consisting of doctor blading, slot die coating, spray painting, and curtain coating.

11. The method of claim 8, wherein applying the separator coating over each electrode to form the first separator coating comprises applying a liquid mixture comprising polyvinylidene fluoride, acetone, and water.

12. The method of claim 8, wherein applying the separator coating over each electrode to form the first separator coating comprises applying a liquid mixture comprising a polymer and a ceramic particle.

13. The method of claim 8, wherein applying the substantially uniform thickness separator coating to each electrode further comprises leaving at least a portion of the continuous electrode sheet that is adjacent to the second separator coating substantially free of the first separator coating and the second separator coating so as to define at least one tab portion of each electrode of the plurality of individual electrodes that is uncoated, the at least one tab portion being configured for conducting current to the battery.

* * * * *